United States Patent
Baumeister et al.

(10) Patent No.: US 6,816,883 B2
(45) Date of Patent: Nov. 9, 2004

(54) METHOD AND SYSTEM FOR INTEGRATION OF NEW MEDIA INTO CHARACTER-ORIENTED APPLICATIONS

(75) Inventors: Sascha Baumeister, Stuttgart (DE); Gerd Breiter, Wildberg (DE); Thomas Raith, Ditzingen (DE)

(73) Assignee: International Business Machines Corporation, Armonk, NY (US)

( * ) Notice: Subject to any disclaimer, the term of this patent is extended or adjusted under 35 U.S.C. 154(b) by 826 days.

(21) Appl. No.: 09/746,061

(22) Filed: Dec. 22, 2000

(65) Prior Publication Data

US 2001/0016869 A1 Aug. 23, 2001

(30) Foreign Application Priority Data

Dec. 23, 1999 (EP) .............................................. 99125777

(51) Int. Cl.[7] .............................................. G06F 15/16
(52) U.S. Cl. ...................... 709/203; 709/217; 709/219; 709/231; 709/232
(58) Field of Search ............................... 709/203, 217, 709/219, 231, 232

(56) References Cited

U.S. PATENT DOCUMENTS

| | | | | |
|---|---|---|---|---|
| 5,758,351 A | * | 5/1998 | Gibson et al. ........... | 707/104.1 |
| 6,041,365 A | * | 3/2000 | Kleinerman ............... | 719/328 |
| 6,353,608 B1 | * | 3/2002 | Cullers et al. .............. | 370/352 |
| 6,434,568 B1 | * | 8/2002 | Bowman-Amuah ..... | 707/103 R |
| 6,615,258 B1 | * | 9/2003 | Barry et al. ................ | 709/223 |

* cited by examiner

Primary Examiner—Nabil El-Hady
(74) Attorney, Agent, or Firm—Lynn L. Augspurger; Floyd A. Gonzalez

(57) ABSTRACT

An improved method and system is provided for providing the end-user of a mainframe application running a limited, character-oriented transfer protocol like the IBM3270 protocol with a combined rendering of non-character, i.e. new media data and traditional character data preferably on the same end-user computer. It is proposed to install an individually programmed program component (28), called Server Media Resolution Service (SMRS) on the application server (16) site and a matching program component (30), called Client Media Resolution Service (CMRS) which is a universal, standard component without any individual application specific features. The SMRS is told the client computer destination, searches the requested media address and feeds this meta information to the CMRS which in turn manages the start of a client site media renderer in order to render the new media data received from a datastore such as the File System (20). A practical example of the media renderer could be a media player (14) which requests and renders a streamable asset provided by a a stream server (22) to said media player (14). Thus, when any change in the host application program is required such changes have to be done in the host application only, the SMRS and the plurality of CMRS components may, however, remain untouched which reduces system programmers work significantly.

12 Claims, 3 Drawing Sheets

METHOD AND SYSTEM FOR INTEGRATION OF NEW MEDIA INTO CHARACTER-ORIENTED APPLICATIONS

FIELD OF THE INVENTION

The present invention relates to computer application technology. In particular, it relates to an improved method and system for providing the end-user of a mainframe application running a limited, character-oriented transfer protocol like IBM 3270 protocol with a combined rendering of non-character, i.e. New media data and traditional character data.

BACKGROUND OF THE INVENTION

The so-called new media data extends traditional computer data formats such as EBCDIC coded text files, DB2 records and tables into more natural data formats for the interaction of humans and computers by incorporating images, motion pictures, voice, audio, and video.

This kind of data is getting more and more important in the information technology business. It accompanies the traditional computer data and the end-user dealing with both types of data expects to view it at the same time on the same rendering device.

Within today's information technology environments we normally see a two-tiered or three-tiered infrastructure:

Tier 1 is thereby represented by an "intelligent" PC (Personal Computer) or NC (Network Computer) or Workstation which is used to render the data which is produced by applications running on tier 2—the so called application servers.

Mostly the tier 1 machines are communicating to tier 2 machines through so-called terminal emulators such as 3270 emulators with an S/390 application server running CICS/IMS applications or a telnet emulator which connects to application servers using the UNIX operating system like SAP/R3.

The application server in that case does not know that it is connected to an "intelligent PC" but just sends ASCII or EBCDIC data down to that "Terminal". In all those cases all functionality resides on the tier 2 application server. That means that the structured data is "pushed" from the host to the client and the rendering of this data is controlled by the host.

In the context of said new media the term 'rendering' is to be understood as comprising playing back image data, audio data, or video data, or motion pictures with the respective suited hardware and/or software arrangement.

The rendering of new media data in contrast is normally initiated from the client. A media renderer "pulls" the data from the application server or at least initiates the "push" from the server. If a user for example wants to view a video, the client workstation passes the so-called Universal Resource Locator, further referred to herein as URL, and according meta data to the server. Then the server streams that video to the client. However, the client workstation has to get the UBL first, in order to initiate a "play" request to the server.

So the problem is to combine the two paradigms to enable the application server on tier 2 to command all the logic required to render all data on the same end user workstation.

A prior art way to solve said problem of combining traditional data and new media data is to "wrap" the traditional user interface on the client workstation by introducing program logic on the client side which performs the integration. In order to achieve that a windows-oriented "wrapper" program must be programmed which envelopes the mainframe application on the client side, i.e., which accesses the relevant data of each mainframe application 'panel' and feeds it to the 'modern' back-end program.

As, however, a mainframe application usually has a very large number of panels provided to the end-user for displaying and entering mainframe application data such work is per se very complex because this requires normally a change of the programming paradigm from the traditional model to an object-oriented model, i.e., a business object model.

The most relevant obstacles, however, to achieve an efficient integration of new media data in those mainframe applications are:

1. In order to extend an existing character-oriented application with new media data changes have to be applied to both, the mainframe application, as well as to the "wrapper" programs running on the client workstations.
2. Such a windows-oriented "wrapper" program has to be installed at multiple locations in the network, i.e., for each end-user location. Then, however, the maintenance of such an end-user IT environment requires a large amount of work as maintenance has to be provided at those multiple, maybe thousands of locations in the network.

The costs associated with such an approach can thus be tremendous.

SUMMARY OF THE INVENTION

It is thus an object of the present invention to provide a method and system for providing non-character data to a client computer coupled to an application server located in a network and using a character-oriented protocol in order to run said application whereby the above mentioned obstacles are removed.

The present invention provices for finding a way which allows a host-initiated mechanism to render non-character data such as the before-mentioned image, audio and video data on a client workstation, while modifying only one single place of application code, namely within the host-based application, like e.g., of the CICS or IMS type.

The example used below describes the process of rendering video data using the streaming technique, because this is the most comprehensive one. However, the invention works the same way for rendering image data or audio data using streaming or store and forward techniques.

This approach splits up in finding a solution for the following two separate problems:

1. The host application has somehow to pass the media URL to the client workstation, such that it will be able to initiate a play request from the media delivery server, further referred to herein as Stream Server, based on the given URL.
2. Client workstations running CICS and IMS 3270 type of terminal emulations are mostly attached via the so-called SNA protocol, while at the same time playing media data requires TCP/IP sessions.

So there is an inherent network protocol and address mapping problem that has to be solved.

Briefly summarizing the basic concepts of the present invention it is proposed to install an individually programmed program component, called Server Media Resolution Service (SMRS) on the application server site and a matching program component, called Client Media Resolution Service (CMRS) which is a universal, standard component without any individual application specific features. The SMRS is told the client computer destination, searches the requested media address and feeds this meta information to the CMRS which in turn manages the start of a client site media renderer in order to render the new media data received from a datastore such as the File System. A practical example of the media renderer could be a media player which requests and renders a streamable asset provided by a a stream server (22) to said media player. Thus, when any change in the host application program is required such changes have to be done in the host application only, the SMRS and the plurality of CMRS components may, however, remain untouched which reduces system programmers work significantly.

The following summarizing list of items shows the data and command flow and the components involved according a preferred aspect of the inventional method and system, respectively.

1) On both the client and on the server said SMRS, and CMRS components are installed. These components are preferably started on both systems at boot time. When a Unix system environment is used at the application server these components can be implemented with Daemon processes.

One example for the address mapping in static configuations is that the Client Media Resolution Service tells the Server Media Resolution Service both addresses, the address of the terminal emulator session, e.g. in an SNA connection the PU/LU address pair of the system, as well as the TCP/IP address of the system at startup time. When dynamic configuration techniques are used, the address mapping is done in the Communication Server on the Application Server and the corresponding addresses can be retrieved dynamically.

2) Within his 'legacy' application subsystem running on CICS or IMS the user presses a function key which requests the rendering, of the media asset belonging to the current transaction, and allows for some playback of said media on the client computer.

3) As the media often reside in some media store accessible via a URL the corresponding media URL is requested from the underlying system managing the access to said dedicated media asset.

4) The 'legacy' application subsystem calls a Browse function of the Server Media Resolution Service. The SMRS component which acts as a 'media provision manager' is thus told the terminal address of the current client session, and the media URL. The SMRS maps the terminal address to the TCP/IP address of the client computer. Thus, the SMRS component knows all meta data required for a subsequent media data delivery to the client.

5) Optionally in case of streamable media, the Server Media Resolution Service prepares all functions an the server side to prepare the streaming. This can include a physical movement of the media to at Stream Server connected with the application server. Said stream server can be located at the location of the application server, or, there can be also a LAN or even a WAN connection between them. Anyhow, the stream server is capable of streaming the media to the client computer system. The SMRS gets back some Streaming Initiation Data, further referred to herein as SID, from the stream server. In this SID data, issued by said stream server, the basic meta information specifying the stream server important control information about the stream server location, the type of connection to the client system, etc. is included.

6) Then, the SMRS sends a message to the Client Media Resolution Service to execute a Browsing/Rendering service, and passes the Streaming Initiation Data to the client, or the media itself in case of store and forward. Optionally, URLs pointing to the streaming metadata or the media file itself can be exchanged.

7) Depending on the client site hardware and software environment the Client Media Resolution Service may generate a temporary file or a metafile as it is necessary for some media players.

8) Then, the CMRS launches the player with all necessary parameters.

9) The player requests the media asset from the Stream Server.

10) The Stream Server streams the asset to the client workstation.

The method and system herein can be used in every environment where a host application needs to render New Media Data. Typical examples are CICS and IMS applications in an IBM environment as well as the 'traditional' UNIX applications using a TELNET type end-user interface or a "X-Windows" type end-user interface, such as products from SAP or BaaN, for example.

The advantage of the inventional method compared to before mentioned prior art integration on the client side is, that only the host application logic has to be changed in case of integration of new media data and when maintenance of the host application is desired. No program logic on the client side has to be introduced, and the traditional client interface can remain untouched.

These and other objects and advantages will be apparent to one skilled in the art from the following drawings and detailed description of the invention.

DESCRIPTION OF THE PREFERRED EMBODIMENT

With general reference to the figures and with special reference now to FIG. 1 the essential program and hardware components used during a preferred embodiment of the disclosed method are described in more detail next below.

An example is given for a case in which an employee of a car insurance company uses a main frame application under a CICS environment with a multitude of panels which enable him to perform the required business processes concerning a car accident the report of which is generated by the main frame application and will be stored in a DB2 database 18.

According to the disclosed approach the employee wants to integrate into his main frame application session some video data which show the damaged car together with a technical car expert talking about and explaining some details of the remaining car value. The employee wants to watch said video in order to work on said case and to make sure that the car owner will get the right amount of damage compensation.

Figure 1:
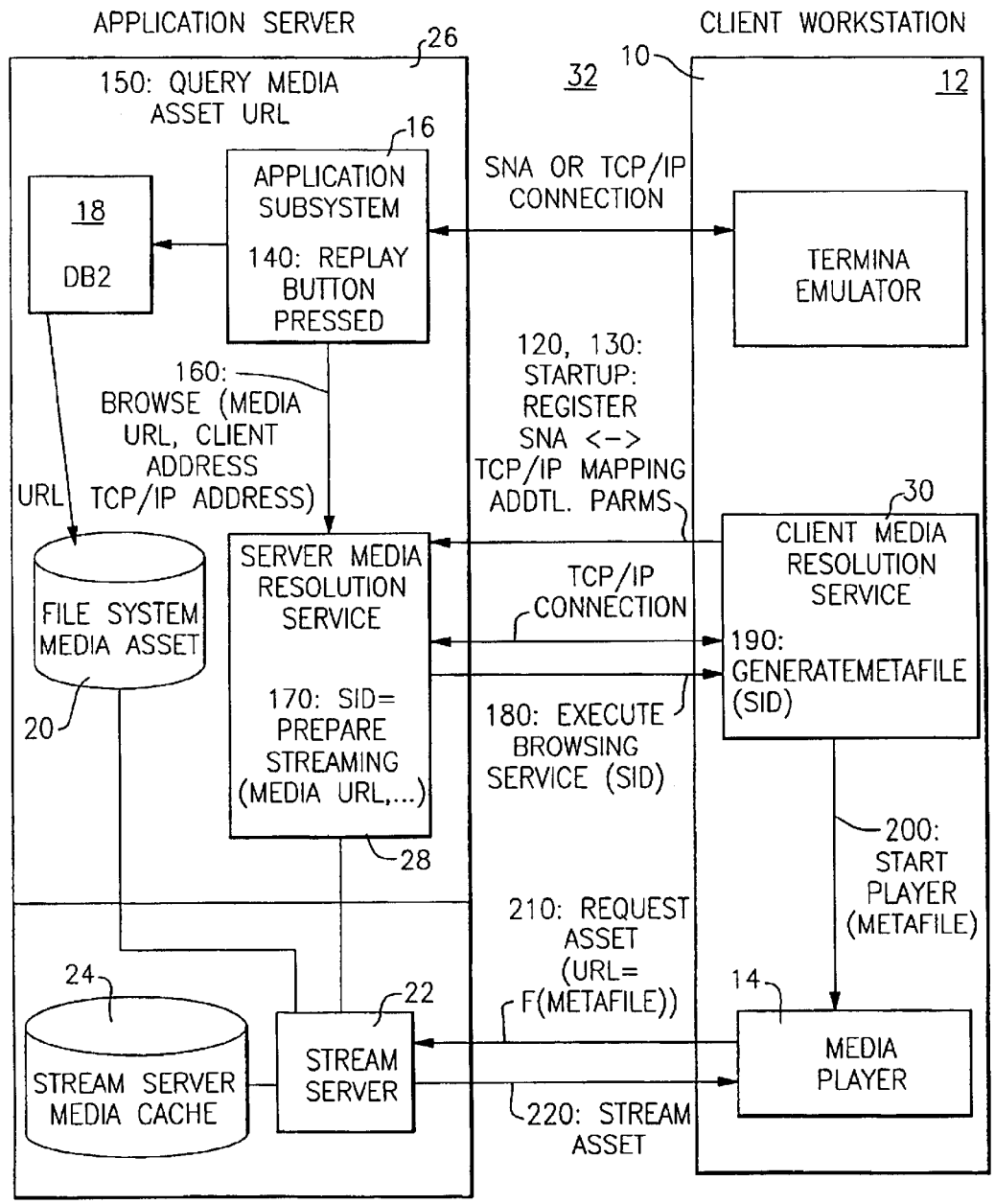
FIG. 1 is a schematic diagram showing the most essential program and hardware components used according to a preferred embodiment of the present invention, FIGS. 2A, and B form a schematic diagram showing the most essential steps and the control flow during the inventional method.

In FIG. 1 the employee's client workstation is shown schematically and in total with reference sign 10. In the present example this is a workstation PC which can at least run some terminal emulator under a 3270 terminal emulation and some media player 14 which is able to be started by the user in order to display a video track. The client workstation 10 is connected via a SNA connection to a main frame application subsystem 16—application server—located somewhere else in the network. It should be mentioned, that a plurality of client workstations form part of said main frame IT environment. Thus, the system is depicted only sectionally in FIG. 1.

As it is very usual in such main frame systems the application server subsystem 16 is connected to a data server located somewhere else in the network which hosts a relational data base, in this case a DB2 data base 18, in which all relevant client data of the car insurance company are stored.

Connected to said data base 18 a further data storage 20 is provided in which said so-called 'new media' like voice, audio data, motion picture data, and video data are stored. Such data can be associated with one or more sets of data stored in the data base 18. A set of new media like a video track can be identified by a URL.

Further, a stream server 22 is located at the location of and is TCP/IP-connected with the application server 16. For sake of generality, it could be placed elsewhere, too. The stream server is connected with an associated stream server media cache 24. Said stream server can be connected via the before mentioned network with the client workstation in order to feed the media player 14 with, e.g. said video track.

According to the basic concepts of the present embodiment on both sides—i.e. the application server side identified by a frame 26—is provided with some piece of program logic which is referred to herein after as SMRS. This program component is depicted with reference number 28.

Figure 2A:
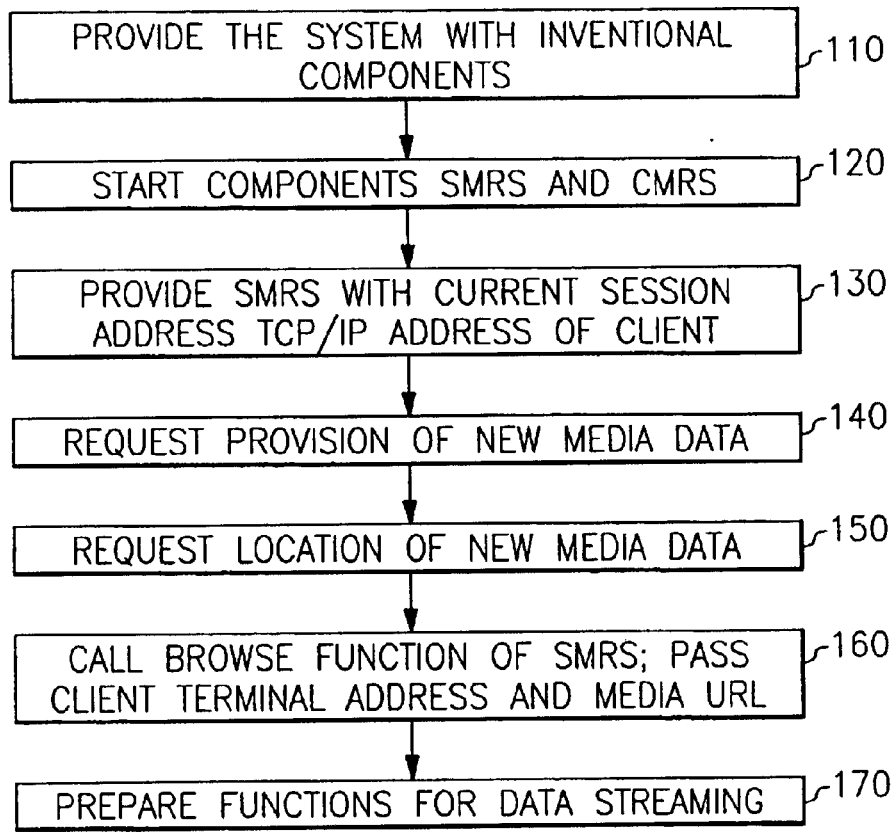

On the client workstations side a corresponding building block 30 is provided according to the present invention which is referred to as CMRS. Both components 28 and 30 can be connected via some network protocol like TCP/IP for example. Corresponding data and commands can be forwarded in both directions. These processes, however are described in more detail with reference to FIGS. 2A, B.

Figure 2B:
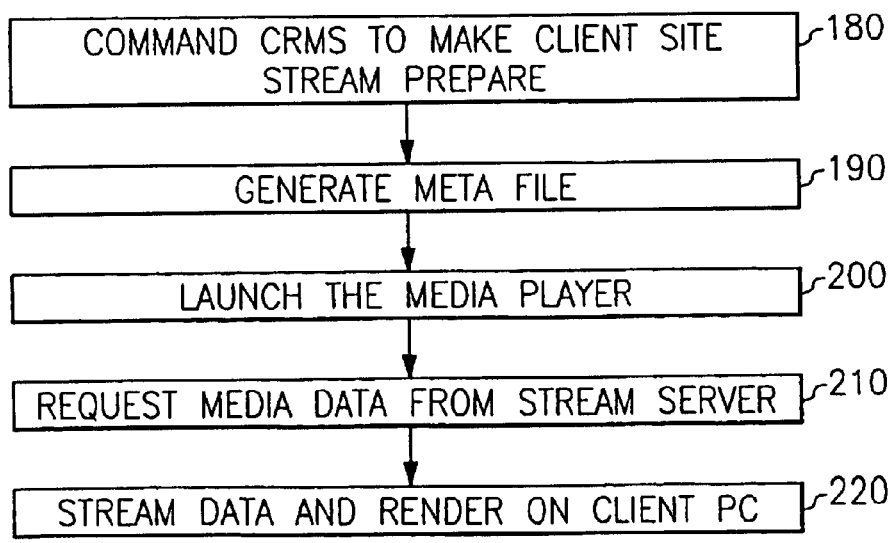

With reference now to FIG. 2 the most essential steps of the present invention are further described herein in more detail.

During a first preparation step 110 the application subsystem 16 has to be provided with the SMRS component 28. Further, the client workstation 10 has to be provided with the CMRS component 30. Dependent of the respective operating system those components can be implemented in a different form. In the example given here both, the application subsystem 16 and the concerned client workstation 10 are UNIX-based. Within the UNIX operating systems such components 28 and 30 can be easily implemented as Daemon processes.

When the employee boots his PC in the morning the client workstation side Daemon process is started whereby the functionality of the CMRS component will become active. The SMRS component can be hold active every time.

The employee starts the mainframe application where a SNA connection is used between the client workstation and the application subsystem. Said connection is depicted with reference number 32 in FIG. 1. Any conventional mainframe application data which are processed from the client workstation are transferred via said connection 32.

In a step 130, the CMRS component tells the SMRS component the address of the terminal emulator session which is for example in a SNA-type connection the LU name, as well as the TCP/IP address of the client workstation system. In this exemplary SNA type connection a mapping is now provided between said SNA address and the TCP/IP address. Said mapping is registered in the SMRS 28. In different cases, for example when TELNET connections are used instead of an SNA connection, such a mapping need not to be done as the single TCP/IP address of the client workstation is sufficient so far.

Figure 3:
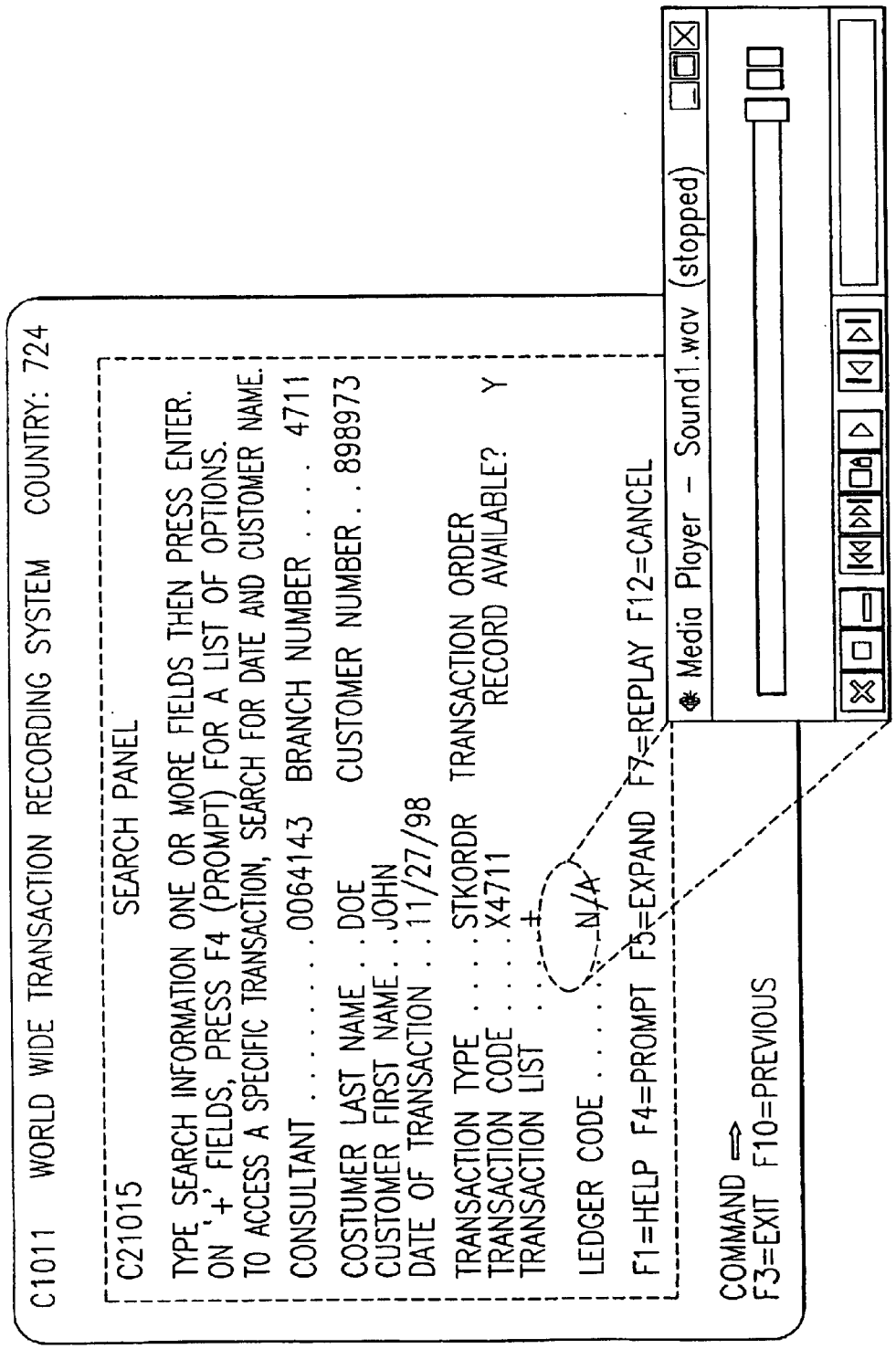
FIG. 3 is a snapshot of an exemplarily chosen end-user screen when the end-user presses a function key according to step 140 of FIG. 2A in order to request the provision of a new media data.

In a step 140, the employee requests the provision of some new media data, which is in the present context said short video track. In order to do this, he presses the F7 function key as it is additionally depicted in the snapshot of FIG. 3. With this user action, the rendering of a particular media asset which belongs to the current trail of the session panel is provided in which the user currently works.

Said signal is transferred via the before mentioned SNA connection to the application subsystem which processes said request and processes it by requesting in turn a media URL from the underlying system, which is the connected DB2 data base 18, step 150. Then, in a next step 160, the application subsystem calls a browse function of the SMRS. Said browse function is provided within SMRS in order to prepare the fundamental prerequisites required for setting up a data stream comprising the required new media data to the client workstation.

The client session's terminal address is passed in the call into the before mentioned browse function. Thus, the SMRS component knows about all relevant control data in order to establish and initiate a later data stream.

Then, in a step 170 said SMRS component prepares all functions on the server side to prepare the streaming. It does the address mapping to get the TCP/IP address of the Client workstation to be able to communicate with its CMRS. The other type of actions which are actually performed during this step is dependent of the IT environment actually present. This can, for example, include a physical movement of the media to the stream server 22 which is capable of streaming the media or just the generation of all the data needed for the media player on the client side to render the media.

Further, in a step 180, a command is sent from the SMRS component to the CMRS component to command the client workstation to execute a so-called browsing service in order to initiate a playing back of the new media data on the client workstation. For this purpose, the command 'execute browsing service' comprises the streaming initiation data, farther referred to herein as SID, which the SMRS component has received during the preceding steps.

The contents of these streaming initiation data is dependent on the IT environment actually present. Basically, those data are used to generate a metafile on the client workstation, step 190.

Said metafile is used to control the media player correctly. In the example present here, such streaming initiation data shall comprise the name of the file to be fetched from the media source 20, for example, a required minimum resolution for the video, the bit rate with which the data stream should be transferred to the client media player 14, in which window the video should be displayed, and other control data.

When the streaming initiation is complete, the CMRS component starts the media player with all necessary parameters, step 200.

Then, the media player 14 requests the media asset from the stream server 22. In said request, the URL is comprised in order to make the stream server know which media asset is requested. Then, in a step 210, the stream server requests the required media asset from the media source 20. Said source copies the media asset into said stream server media cache 24 from which the stream server 22 streams the data to the client workstation side media player 14 according to prior art.

Thus, the new media data are rendered at the client site as it was intended to be demonstrated, step 220.

When the employee switches off his workstation the client side Daemon processes are terminated normally.

As should be apparent from the foregoing description, the present embodiment introduces a pair of software components as is depicted in FIG. 1 with SMRS and CMRS for a communication between one client and a central application server. For a plurality of clients, as will usually be the case, a corresponding number of CMRS modules are installed in the system in order to enable each client to have the functionality just described above.

The great advantage is, that those new inventional components SMRS and CMRS need not to be changed whenever the host application must be changed from one version to the other, as those components isolate the real core of new media provision and rendering from any other program activity involved So, when any host application program has to be changed, the CMRS and SMRS components remain untouched by that and the client side is not addressed at all by said change.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

The present invention can be realized in hardware, software, or a combination of hardware and software.

A Media Resolution Service tool according to the present invention, can be realized in a centralized fashion as a SMRS program component on the application server, and cooperating with a plurality of CMRS components distributed across any type of network.

Further, different software elements could be spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein, as in particular the CRMS part on the client, or the SRMS part on the application server.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following:

a) conversion to another language, code or notation;
b) reproduction in a different material form.

While the preferred embodiment of the invention has been illustrated and described herein, it is to be understood that the invention is not limited to the precise construction herein disclosed, and the right is, reserved to all changes and modifications coming within the scope of the invention as defined in the appended claims.

What is claimed is:

1. A method for providing non-character data to a client computer system at a client site coupled to an application server located at an application server site in a network using a character-oriented protocol in order to run applications, wherein the network includes a data server connected to the application server, the method comprising the steps of:

initiating a non-character data request from the client site to the application server site, said request comprising at least the client's site location identification (ID); and in response to said request, performing steps required to access and provide said requested data in an encapsulated manner, logically separated from a front-end host application program at the client site for receiving the non-character data;

wherein the performed steps required for accessing and providing said requested data in an encapsulated manner comprises the steps of:

requesting the location of said non-character data from said data server;

feeding a dedicated program component associated with said application server with said client's side location ID and the location of said non-character data;

preparing a data transfer to said client system comprising said non-character data;

initiating an activation of a universal program component associated with the client and dedicated to serve the non-character data to said client site; and providing said client computer system with the requested data in order to be rendered at said client site by said front-end host application program.

2. The method according to claim 1 in which said data transfer is a data stream.

3. The method according to claim 1 in which said character-oriented protocol is IBM3270 protocol, or SNA protocols LU 0, LU 2, or LU 6.2, or TELNET.

4. A system for providing non-character data to a client computer system at a client site coupled to an application server located at an application server site in a network using a character-oriented protocol in order to run applications, wherein the network includes a data server connected to the application server, the system comprising:

means for initiating a non-character data request from the client site to the application server site, said request comprising at least the client's site location identification (ID); and means for performing, in response to said request, steps required to access and provide said requested data in an encapsulated manner, logically separated from a front-end host application program at the client site for receiving the non-character data;

wherein the means for performing steps required to access and provide said requested data in an encapsulated manner comprises:

means for requesting the location of said non-character data from said data server;

means for feeding a dedicated program component associated with said application server with said client's side location ID and the location of said non-character data;

means for preparing a data transfer to said client system comprising said non-character data;

means for initiating an activation of a universal program component associated with the client and dedicated to serve the non-character data to said client site; and means for providing said client computer system with the requested data in order to be rendered at said client site by said front-end host application program.

5. The system according to claim 4 in which said data transfer is a data stream.

6. The system according to claim 4 in which said character-oriented protocol is IBM3270 protocol, or SNA protocols LU 0, LU 2, or LU 6.2, or TELNET.

7. A system comprising:

a network a client computer system in said network at a client site;

an application server in said network at an application server site and coupled to said client computer system, said application server using a character-oriented protocol in order to run applications;

said client computer system initiating a request for non-character data to the application server site, said request comprising at least the client's site location identification ID;

said application server, in response to said request, accessing and providing said requested non-character data in an encapsulated manner;

a front-end host application program at the client site for receiving the non-character data;

a data server connected to the application server operable for providing the requested non-character data;

said client computer system operable for requesting the location of said non-character data from said data server;

a dedicated program component associated with the application server feeding said location ID and the location of said non-character data to said application server and preparing a data transfer to said client system comprising said non-character data;

a universal program component associated with the client and dedicated to serve the non-character data to said client computer system; and said front-end host application program in said client computer system rendering said non-character data at said client site.

8. The system according to claim 7 in which said front-end application program includes a viewer, or an audio player, or a video player.

9. The system according to claim 7 in which said front end host application program is logically separated from the accessing and providing of said requested non-character data.

10. A computer program product comprising a computer usable medium having computer readable program code means therein for providing non-character data to a client computer system at a client site coupled to an application server located at an application server site in a network using a character-oriented protocol in order to run applications, wherein the network includes a data server connected to the application server, said computer readable program code means in said computer program product comprising:

computer readable program code means performing the claimed method steps, is inherent in disclosure;

computer readable program code means for initiating a non-character data request from the client site to the application server site, said request comprising at least the client's site location identification (ID); and computer readable program code means for performing, in response to said request, steps required to access and provide said requested data in an encapsulated manner, logically separated from a front-end host application program at the client site for receiving the non-character data;

wherein the computer readable program code means for performing steps required to access and provide said requested data in an encapsulated manner comprises:

computer readable program code means for requesting the location of said non-character data from said data server;

computer readable program code means for feeding a dedicated program component associated with said application server with said client's side location ID and the location of said non-character data;

computer readable program code means for preparing a data transfer to said client system comprising said non-character data;

computer readable program code means for initiating an activation of a universal program component associated with the client and dedicated to serve the non-character data to said client site; and computer readable program code means for providing said client computer system with the requested data in order to be rendered at said client site by said front-end host application program.

11. The computer program product according to claim 10 in which said data transfer is a data stream.

12. The computer program product according to claim 10 in which said character-oriented protocol is IBM3270 protocol, or SNA protocols LU 0, LU 2, or LU 6.2, or TELNET. logically separated from the accessing and providing of said requested non-character data.

* * * * *